US007632779B1

(12) United States Patent
Ding et al.

(10) Patent No.: US 7,632,779 B1
(45) Date of Patent: Dec. 15, 2009

(54) METHOD OF PREPARING A CATALYST FOR DIRECT FORMIC ACID FUEL CELLS

(75) Inventors: Yi Ding, Shandong (CN); Rongyue Wang, Shandong (CN)

(73) Assignee: Filigree Nanotech, Inc., Huntersville, NC (US)

( * ) Notice: Subject to any disclaimer, the term of this patent is extended or adjusted under 35 U.S.C. 154(b) by 29 days.

(21) Appl. No.: 12/330,866

(22) Filed: Dec. 9, 2008

(51) Int. Cl.
 *B01J 23/48*   (2006.01)
 *B01J 23/50*   (2006.01)
 *H01M 8/10*   (2006.01)
 *H01M 4/00*   (2006.01)
 *H01M 4/88*   (2006.01)
 *B32B 15/01*   (2006.01)

(52) U.S. Cl. .......................... 502/347; 429/33; 429/40; 502/101; 428/670; 428/672; 428/673

(58) Field of Classification Search ............... 429/30, 429/33, 40; 502/101, 347; 427/115; 428/613, 428/672, 670, 673, 457, 606
See application file for complete search history.

(56) References Cited

U.S. PATENT DOCUMENTS

| | | |
|---|---|---|
| 4,977,038 A | 12/1990 | Sieradzki et al. |
| 6,805,972 B2 * | 10/2004 | Erlebacher et al. .......... 428/613 |

| | | |
|---|---|---|
| 2005/0112432 A1 | 5/2005 | Erlebacher et al. |

\* cited by examiner

*Primary Examiner*—Jerry Lorengo
*Assistant Examiner*—Eli Mekhlin
(74) *Attorney, Agent, or Firm*—Hammer & Associates, P.C.

(57) ABSTRACT

A method for preparing a catalyst comprising the steps of: providing a gold-silver alloy article, removing the silver from the article by immersing the article in a de-alloying solution to form a nanoporous gold (NPG) article with a plurality of nanopores followed by cleaning the surface of the NPG article and removing the de-alloying solution from the nanopores with deionized water. An electrode is attached to the NPG article and a monoatomic layer/lower layer of copper, silver, or lead, is deposited onto the surface of and within the nanopores of the NPG article by immersing the NPG article in an ion solution to form an M-NPG article. The M-NPG article is removed from the ion solution and the monoatomic/lower layer is replaced with platinum ions by immersing the M-NPG article into a platinum ion solution followed by cleaning the electrode and the NPG-Pt article with deionized water. A monoatomic layer/lower layer of copper, silver, or lead, is then deposited onto the surface of and within the nanopores of the NPG-Pt article by immersing the NPG-Pt article in an ion solution to form an M-NPG-Pt article. The M-NPG-Pt article is removed from the ion solution and the monoatomic/lower layer of copper, silver, or lead is replaced with gold ions by immersing the M-NPG-Pt article into a gold ion solution to form an NPG-Pt—Au article followed by cleaning the electrode and the NPG-Pt—Au article with deionized water.

20 Claims, 4 Drawing Sheets

US 7,632,779 B1

METHOD OF PREPARING A CATALYST FOR DIRECT FORMIC ACID FUEL CELLS

FIELD OF THE INVENTION

The invention relates to method for preparing a catalyst for direct formic acid fuel cells with low noble metal loading, strong toxic resistance and long service life.

BACKGROUND OF THE INVENTION

Excessive use of conventional fossil fuels has resulted in environmental pollution and an energy crisis. As a result, government agencies, enterprises and researchers all over the world are increasingly concerned with discovering sustainable energy sources and the development of energy conversion devices. A fuel cell is an energy conversion device that converts the chemical energy of a fuel, when combined with an oxidant, directly into electricity with merits such as high efficiency of energy conversion, non-pollution and many others. A proton exchange membrane fuel cell (PEMFC) operates at relatively low temperature and has a compact structure.

Among various fuel cells, PEMFCs are particularly promising for use as a back-up power station, stationary power generation, or as a portable power supply for electronics and vehicles. However, the storage and transportation of hydrogen, the major fuel for PEMFC, is still very difficult. As a relative and strong candidate, both direct methanol fuel cells (DMFC) and direct formic acid fuel cells (DFAFC) show significant advantages over PEMFCs in energy supply. Recently, continuous efforts have been put into the development of DFAFCs, due to higher theoretical open circuit potential, lower fuel crossover and many other advantages over the direct methanol fuel cell.

Two key issues inhibit the commercialization of DFAFC: the first being low efficiency and the second being the poor stability of its catalysts. Platinum (Pt) is major fuel cell catalyst component. However, carbon monoxide (CO) from the oxidation of formic acid can easily poison (contaminate) the platinum and cause it to lose its catalytic function. Therefore, palladium (Pd) based compounds are often used as an anodic catalyst in DFAFC. Unfortunately, a Pd-based composite catalyst may also display poor stability if it suffers "the poisoning effect" from the carbonaceous intermediates generated during the reaction.

The formic acid on the surface of platinum is oxidized to $CO_2$ via a dual-path mechanism. A direct dehydrogenation path generates $CO_2$ which is not harmful to the catalyst, while an indirect dehydration path generates CO which is toxic to the catalyst. One solution is to incorporate some atoms of bismuth or lead onto the surface of the platinum to improve its effectiveness in formic acid oxidation and to guide the oxidation toward the more desirable direct dehydrogenation path. However, absorbed atoms are very unstable on the surface of platinum. Hence, this type of surface modification to improve the catalyst has little value in practical applications.

In order to increase the utilization of platinum, amorphous carbon (carbon black or carbon fiber) may be used in the catalysts for fuel cells as an inexpensive means of support. However, carbon support is unstable during the electro-oxidation reaction and so the utilization of platinum is still not high enough to satisfy commercial applications. A need exists to find a new method of preparing a catalyst with low Pt loading, strong toxic resistance, and long service life for direct formic acid fuel cells.

Metal alloys having a certain composition can be turned into uniform nanoporous metal materials by electrochemical etching. Uniform nanoporous metal materials have a high specific surface area and an adjustable structure. Uniform nanoporous metal materials are able to serve as structural support in electrocatalysts due to following distinctive characteristics: 1) large specific surface area due to three-dimensional nanoporous structure; 2) superior conductivity; and 3) strong corrosion resistance. Karl Sieradzki and Roger C. Newman reported a method of forming porous metal structure by removing the silver via electrochemical etching (Karl Sieradzki, Roger C. Newman "Micro- and Nano-porous Metallic Structures" U.S. Pat. No. 4,977,038, Dec. 11, 1990). In 2004, inventor of the instant patent application acquired a US patent on a method of forming nanoporous membranes with high specific surface area by etching commercial metal alloy membranes (Jonah Erlebacher, Yi Ding "Method of Forming Nanoporous Membranes" U.S. Pat. No. 6,805,972). In the same year, the inventor of the instant patent application acquired a worldwide patent on a method of plating nanoporous metal membranes by an electroless plating process of reducing precious metal ions with hydrazine vapor (Jonah Erlebacher, Yi Ding "Method of Plating Metal Leafs and Metal Membranes"). In the instant invention the catalysts were fabricated via a successive deposition of thin platinum and gold layers onto the surface of nanoporous gold membranes with monoatomic layer precision. The techniques involved in this procedure are Under Potential Deposition and replacement reaction.

The above reference is incorporated by reference herein where appropriate for appropriate teachings of additional or alternative details, features and/or technical background.

SUMMARY OF THE INVENTION

A method for preparing a catalyst comprising the steps of: providing a gold-silver alloy article, removing the silver from the article by immersing the article in a de-alloying solution to form a nanoporous gold (NPG) article with a plurality of nanopores followed by cleaning the surface of the NPG article and removing the de-alloying solution from the nanopores with deionized water. An electrode is attached to the NPG article and a monoatomic layer/lower layer of copper, silver, or lead is deposited onto the surface of and within the nanopores of the NPG article by immersing the NPG article in an ion solution to form an M-NPG article. The M-NPG article is removed from the ion solution and the monoatomic/lower layer is replaced with platinum ions by immersing the M-NPG article into a platinum ion solution followed by cleaning the electrode and the NPG-Pt article with deionized water. A monoatomic layer/lower layer of copper, silver, or lead, is then deposited onto the surface of and within the nanopores of the NPG-Pt article by immersing the NPG-Pt article in an ion solution to form an M-NPG-Pt article. The M-NPG-Pt article is removed from the ion solution and the monoatomic/lower layer of copper, silver, or lead is replaced with gold ions by immersing the M-NPG-Pt article into a gold ion solution to form an NPG-Pt—Au article followed by cleaning the electrode and the NPG-Pt—Au article with deionized water.

DETAILED DESCRIPTION

Figure 1:
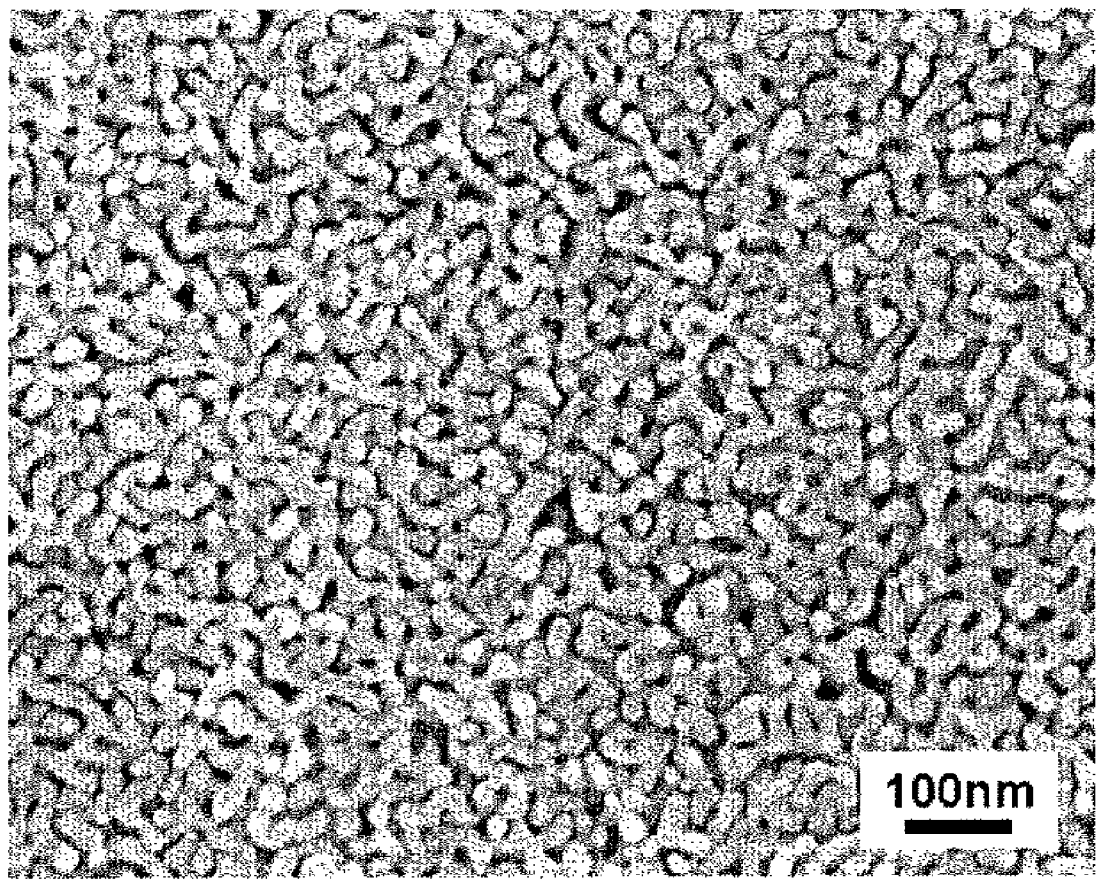
FIG. 1 is an SEM image showing the structure of a nanoporous gold membrane made according to the methods of the present invention.

The present invention relates to catalysts, electrodes, and membrane electrodes suitable for use in a formic acid oxidation reaction and within a direct formic acid fuel cell.

There is currently interest in the use of formic acid, formaldehyde, and/or ethanol, as an energy source for fuel cells. Among these small organic molecules, formic acid shows various advantages as an energy source for DFAFCs which include, but are not limited to: a) formic acid is safer; b) formic acid is easy to preserve and transport safely; c) theoretic open circuit voltage of formic acid (1.45 V) is higher than methanol's (1.18 V) and ethanol's (1.145 V); d) the efficiency of a fuel cell remains at a high level in the concentrated solution (20 mol/L); e) as an electrolyte, formic acid can improve the proton conductivity for the whole fuel cell; and f) the permeability of formic acid in fuel cells is quite low due to the repelling interaction between the anions of formic acid and the sulfonic groups of the Nafion membrane.

In the past few years, great progress has been made in direct formic acid fuel cell (DFAFC) science and technology. However, the commercialization of DFAFC is still hindered by some technical challenges, especially the unsatisfactory catalytic activity of catalysts for formic acid. In order to improve the catalytic activity of catalysts, considerable research has focused on seeking new support materials that can provide novel properties and improve the overall performance of the catalysts.

It has been discovered that highly conductive carbon materials which include, but are not limited to, XC-72, expanded graphite, graphite nanofiber, ordered porous carbon, and carbon nanotube, each provide a high dispersion of metal nanoparticles and facilitate electron transfer, resulting in improved catalytic activity. In addition to functioning as an active support material, the highly conductive carbon material may also have a catalytic role which contributes to the enhancement of methanol or formic acid electrooxidation. For example, a nitrogen containing carbon nanotube, such as a ruthenium oxides/Vulcan XC-72 mixed support, a carbon-silica composite, or a WO3/C hybrid material could bring about the strong metal-support interaction that would greatly affect the electrochemical properties of the fuel cell catalysts.

The durability of a platinum catalyst may be significantly improved by depositing gold nanoparticles on platinum particles via the Under Potential Deposition (UPD) method. Gold nanoparticles are very stable on a platinum surface due to the metal similarities of gold and platinum. Depositing a particular amount gold particles onto platinum particles will not only enhance the anti-poisoning properties of a platinum catalyst by decreasing the amount of CO generated during the reaction, but also prolong the life of the platinum catalyst by preventing the platinum from undergoing an oxidation reaction. Recently, we have discovered that gold nanoparticle catalysts are particularly effective in CO oxidation at ambient conditions. Inspired by the potential that adatoms may block certain reaction sites and effectively tune the reaction pathways, the present invention designs and fabricates a layer-structured nanoporous gold-platinum-gold (NPG-Pt—Au) membrane catalyst on which the catalytic activity toward formic acid electro-oxidation is greatly enhanced via alteration of the reaction pathways by top layer gold clusters.

Figure 4:
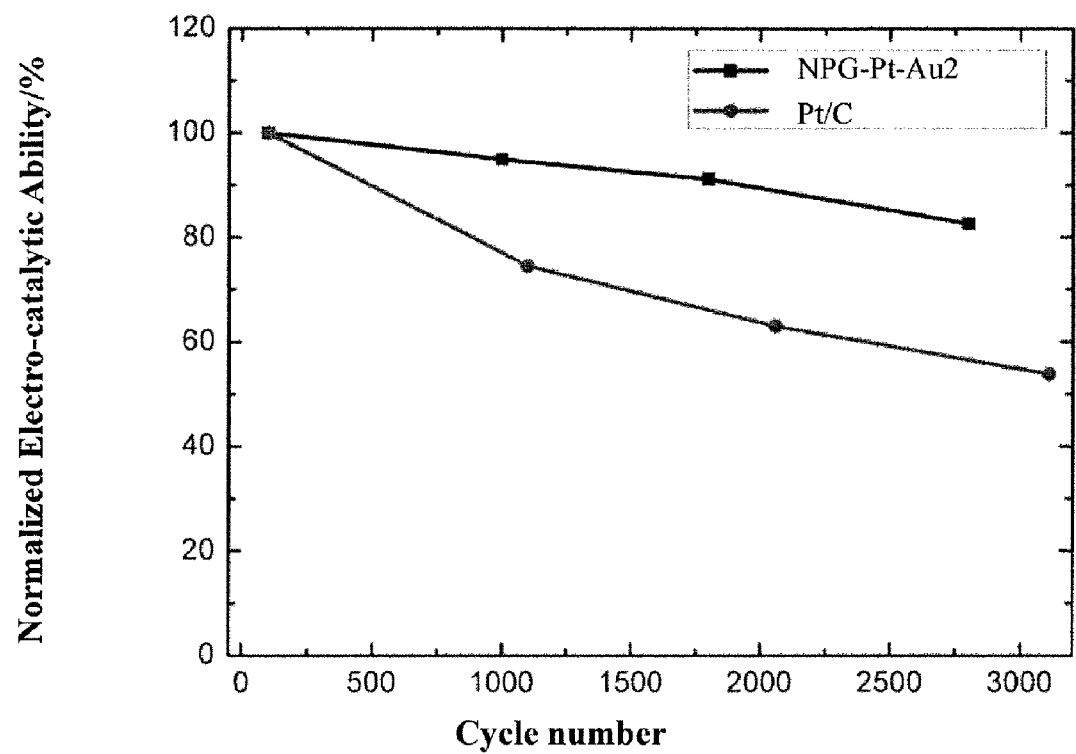
FIG. 4 is a diagram of normalized electro-catalytic ability as a function of the cyclic voltammery (CV) cycle number obtained for platinum on commercial platinum on carbon (Pt/C) and monolayer platinum decorated NPG with further gold deposition for two times (NPG-Pt1-Au2) according to the present invention in a mixed solution of 0.1M $HClO_4$ and 0.05M HCOOH.

The present invention successfully fabricates a new type of nanostructured electro-catalysts that simultaneously fulfills the three key requirements for a good practical catalyst: 1) ultra-low Pt loading, 2) great tolerance to poisoning, and 3) high stability. In one particular embodiment, a layer-structured, high surface area membrane catalyst was designed and constructed by depositing sub-monolayer Au onto a nanoporous gold (NPG) supported Pt monolayer, which demonstrates dramatically improved catalytic performance in formic acid oxidation (FIG. 4). While it is possible to tailor the respective structures and compositions within each structure unit, the present invention represents a general design strategy to functional nanocatalysts which would find applications in clean energy conversion technologies such as fuel cells. Other features and advantages of the present invention will become apparent from the following detailed description, taken in conjunction with the accompanying drawings, which illustrate, by ways of examples, the features of the invention.

A. DEFINITIONS

As used herein, the term "NPG" is intended to mean nanoporous gold, which are prepared according to the present invention.

As used herein, the term "NPG-Pt" is intended to mean monolayer platinum decorated NPG without further gold deposition according to the present invention.

As used herein, the term "NPG-Pt—Au" is intended to mean monolayer platinum decorated NPG with two additional gold depositions according to the present invention.

As used herein, the term "NPG-Pt2" is intended to mean bilayer platinum decorated NPG without further gold deposition according to the present invention.

As used herein, the term "NPG-Pt2-Au1" is intended to mean bilayer platinum decorated NPG with one additional gold deposition according to the present invention.

B. EMBODIMENTS

One embodiment of the present invention involves a method for preparing a catalyst for a fuel cell, comprising the steps of:
 a) providing a gold-silver alloy article;
 b) removing the silver from the article by immersing the article in a de-alloying solution for a certain time period at a certain temperature to form a nanoporous gold (NPG) article with a plurality of nanopores;
 c) cleaning the surface of the NPG article and removing the de-alloying solution from the nanopores;
 d) attaching an electrode to the NPG article;
 e) depositing a monoatomic layer/lower layer of copper, silver, or lead, onto the surface of and within the nanopores of the NPG article through the use of a cyclic voltammery (CV) method or a potentiostatic method by immersing said NPG article in an ion solution comprising a copper, a silver, or a lead ion, to form an M-NPG article, where M denotes elemental copper, silver or lead f) removing the M-NPG article from the ion solution;

g) replacing the monoatomic/lower layer with platinum ions by immersing the M-NPG article into a platinum ion solution;

h) cleaning the electrode and the NPG-Pt article;

i) depositing a monoatomic layer/lower layer of copper, silver, or lead onto the surface of and within the nanopores of the NPG-Pt article through the use of a cyclic voltammery (CV) method or a potentiostatic method by immersing the NPG-Pt article in an ion solution to form an M-NPG-Pt article;

j) removing the M-NPG-Pt article from the ion solution;

k) replacing the monoatomic/lower layer of copper, silver, or lead with gold ions by immersing the M-NPG-Pt article into a gold ion solution to form an NPG-Pt—Au article; and l) cleaning the electrode and the NPG-Pt—Au article.

The instant invention is also the product created by the method described above. In one embodiment of the present invention, steps d-l may be applied to nanoparticles and/or nanoporous materials in order to deposit mono or sub-mono atom layers of one type of metal onto another type of metal.

In another embodiment, the catalyst for a fuel cell described above may be for a direct formic acid fuel cell. Additionally, the catalyst described above may have a low Pt loading amount, a strong tolerance to catalyst poisons, and a long service life, as compared with the traditional carbon supported Pt nanoparticles catalysts.

In yet another embodiment of the method described above, the gold-silver alloy article described in step a) may comprise 10% to 60% gold (wt %) and 40% to 90% silver (wt %) and the article may have a length of 0.1 to 1000 cm, a width of 0.1 to 100 cm, and a thickness of 0.01 to 1000 μm.

In still another embodiment of the method described above, the de-alloying solution described in step b) may comprise 0.1 to 70% $HNO_3$ (wt %), the time period may be between 1 s to 100 min, and the temperature may be between of 0 to 50° C.

In yet another embodiment of the method described above, the cleaning of the surface of the NPG article and the removal of the de-alloying solution from the nanopores described in step c) may be completed with deionized water.

In another embodiment of the method described above, the ion solution described in step e) may comprise 1 μmol/$dm^3$ to 10 mol/$dm^3$ of copper, silver, or lead ion.

In another embodiment of the method described above, the platinum ion solution described in step g) may comprise 1 μmol/$dm^3$ to 10 mol/$dm^3$ of platinum ion and the time period may be between 1 min to 100 h.

In another embodiment of the method described above, the cleaning of the NPG-Pt article described in step h) may be completed with deionized water.

In another embodiment of the method described above, the ion solution described in step j) may comprise 1 μmol/$dm^3$ to 10 mol/$dm^3$ of copper, silver, or lead ion.

In another embodiment of the method described above, the gold ion solution described in step k) may comprise 1 μmol/$dm^3$ to 10 mol/$dm^3$ of gold ion and the time period may be between 1 min to 100 h.

In another embodiment of the method described above, the cleaning of the NPG-Pt—Au article described in step l) may be completed with deionized water.

In still another embodiment of the method for preparing a catalyst described above, steps e-h may be repeated to increase the loading of platinum onto the NPG. Additionally, steps i-l may be repeated to increase the loading of gold onto the NPG.

Another embodiment of the present invention involves a method of preparing a catalyst comprising the following steps:

a) providing a gold-silver alloy article comprising 10% to 60% gold (wt %) and 40% to 90% silver (wt %) and said article having a length of 0.1 to 1000 cm, a width of 0.1 to 100 cm, and a thickness of 0.01 to 1000 μm;

b) removing said gold from said gold-silver alloy article by immersing said gold-silver alloy article in a de-alloying solution comprising 0.1 to 70% $HNO_3$ (wt %) for a time period of between 1 s to 1000 min at a temperature of 0 to 50☐ forming a nanoporous gold (NPG) article having a plurality of nanopores;

c) cleaning the surface of said NPG article and removing said de-alloying solution from said nanopores with deionized water;

d) attaching an electrode to said NPG article;

e) depositing a monoatomic layer/lower layer of copper, silver, or lead, onto the surface of and within the nanopores of said NPG article through the use of a cyclic voltammery (CV) method or a potentiostatic method by immersing said NPG article in an ion solution comprising 1 μmol/$dm^3$ to 10 mol/$dm^3$ of copper, silver, or lead ion, to form a M-NPG article, where M denotes elemental copper, silver or lead;

f) removing said M-NPG article from said ion solution;

g) replacing said monoatomic/lower layer of copper, silver, or lead with platinum ions by immersing said M-NPG article into a platinum ion solution comprising 1 μmol/$dm^3$ to 10 mol/$dm^3$ of platinum ion for a time period of between 1 min to 100 h to form an NPG-Pt article;

h) cleaning said electrode and said NPG-Pt article with deionized water;

i) repeating steps d-h will result in an increase in the loading of platinum onto said NPG-Pt article;

j) depositing a monoatomic layer/lower layer of copper, silver, or lead, onto the surface of and within the nanopores of said NPG-Pt article through the use of a cyclic voltammery (CV) method or a potentiostatic method by immersing said NPG-Pt article in an ion solution comprising 1 μmol/$dm^3$ to 10 mol/$dm^3$ of copper, silver, or lead ion, to form an M-NPG-Pt article, where M denotes elemental copper, silver or lead;

k) removing said M-NPG-Pt article from said ion solution;

l) replacing said monoatomic/lower layer of copper, silver, or lead with gold ions by immersing said M-NPG-Pt article into a gold ion solution comprising 1 μmol/$dm^3$ to 10 mol/$dm^3$ of gold ion for a time period of between 1 min to 100 h to form an NPG-Pt—Au article;

m) cleaning said electrode and said NPG-Pt—Au article with deionized water;

n) repeating steps j-m will result in an increase in the loading of gold onto said NPG-Pt—Au article/catalyst.

The instant invention is also the product created by the method described above. In one embodiment of the method described above, the gold-silver alloy article described in step a) preferably has a length of from about 0.1 cm to about 1000 cm, more preferably about 6 cm to about 20 cm. In another embodiment of the method described above, the gold-silver alloy article described in step a) preferably has a width of from about 0.1 cm to about 100 cm, more preferably about 1 cm to about 5 cm. In still another embodiment of the method described above, the gold-silver alloy article described in step a) preferably has a thickness of from about 0.01 μm to about 100 μm, more preferably about 0.1 μm to about 10 μm. In still another embodiment of the method described above, the gold-silver alloy article described in step a) preferably has a composition of 10% to 60% gold by weight and the balance silver. In yet another embodiment of the method described above, the gold-silver alloy article described in step a) has a composition of 37.5% gold by weight and the balance silver.

In another embodiment of the method described above, the de-alloying solution described in step b) may be concentrated or diluted. In still another embodiment of the method described above, the de-alloying solution described in step b) is an acid. In certain embodiments of the present invention, the de-alloying solution is nitric acid and has a concentration of 0.1% to 70% by weight, more preferably about 65% to 68% by weight. In still another embodiment of the method described above, the time that the gold-silver alloy article is immersed in the de-alloying solution as described in step b) is preferably from is to 1000 min, more preferably about 120 min. In still another embodiment of the method described above, the temperature at which the gold-silver alloy article is immersed in the de-alloying solution is from 0° C. to 50° C., and more preferably from 20° C. to 30° C.

In another embodiment of the method described above, the copper ion solution, silver ion solution, or lead ion solution as described in step e) has a concentration of 1 μmol/dm$^3$ to 10 mol/dm$^3$. Also according to the step e) of the above embodiment of the present invention, the under potential deposition method utilized for depositing copper onto the NPG article/electrode is completed by immersing the NPG article/electrode into a copper ion solution under constant voltage from 0.25V to 0.45V (vs. RHE) for 5 min. Also according to the step e) of the above embodiment of the present invention, the under potential deposition method utilized for depositing silver onto the NPG article/electrode is completed by immersing the NPG article/electrode into a silver ion solution under constant voltage from 0.65V to 0.85V (vs. RHE) for 5 min. Also according to the step e) of the above embodiment of the present invention, the under potential deposition method utilized for depositing lead onto the NPG article/electrode is completed by immersing the NPG article/electrode into a lead ion solution under constant voltage from −0.1V to 0.1V (vs. RHE) for 5 min.

In another embodiment of the method described above, the platinum ion solution described in step g) preferably has a concentration of 1 μmol/dm$^3$ to 10 mol/dm$^3$, more preferably about 1 mmol/dm$^3$. Also according to the step g) of the above embodiment of the present invention, the time that the as-prepared M-NPG article/electrode immersed in the platinum ion solution is preferably from 1 min to 100 h, more preferably about 10 min.

In another embodiment of the method described above, the number of repeats described in step i) is preferably 0 to 10. The loading amount of platinum on the surface of the NPG-Pt article can be calculated by the amount of copper, silver, or lead deposited under potential.

In another embodiment of the method described above, the copper ion solution, silver ion solution, or lead ion solution described in step j) has a concentration of 1 μmol/dm$^3$ to 10 mol/dm$^3$. Also according to step j) of the above embodiment of the present invention, the under potential deposition method utilized for depositing copper onto the NPG-Pt article/electrode is completed by immersing the NPG-Pt article/electrode into a copper ion solution under constant voltage from 0.25V to 0.45V (vs. RHE) for 5 min. Also according to the step j) of the above embodiment of the present invention, the under potential deposition method utilized for depositing silver onto the NPG-Pt article/electrode is completed by immersing the NPG-Pt article/electrode into a silver ion solution under constant voltage from 0.65V to 0.85V (vs. RHE) for 5 min. Also according to the step j) of the above embodiment of the present invention, the under potential deposition method utilized for depositing lead onto the NPG-Pt article/electrode is completed by immersing the NPG-Pt article/electrode into a lead ion solution under constant voltage from −0.1V to 0.1V (vs. RHE) for 5 min.

In another embodiment of the method described above, the gold ion solution described in step l) preferably has a concentration of 1 μmol/dm$^3$ to 10 mol/dm$^3$, more preferably about 1 mmol/dm$^3$. Also according to step l) of the above embodiment of the present invention, the time that the as-prepared NPG-Pt article/electrode is immersed in the gold ion solution is preferably from 1 min to 100 h, more preferably about 10 min.

In another embodiment of the method described above, the number of repeats described in step n) is preferably 0 to 10. The loading amount of gold on the surface of the NPG-Pt—Au article can be calculated by the amount of copper, silver, or lead deposited under potential.

Another embodiment of the present invention involves a method of preparing a catalyst for a direct formic acid fuel cell, wherein the catalyst has a thickness of from about 0.01 μm to about 1000 μm, and a width of from about 0.1 cm to about 100 cm, and a length of from about 0.1 cm to about 1000 cm. In still another embodiment, a catalyst prepared according to the present invention has a thickness of from about 0.1 μm to about 10 μm, and a width of from about 1 cm to about 5 cm, and a length of from about 6 cm to about 20 cm.

In yet another embodiment, a catalyst prepared according to the present invention is a piece of metal alloy, which has a three-dimensional nanoporous structure and the resultant nanopore size is from 2 nm to 100 nm. In another embodiment, a catalyst prepared according to the present invention is a piece of metal alloy, which has a plurality of atomic or subatomic layers of platinum or/and gold on the surface, with a gold layer being above the platinum layer.

Figure 2:
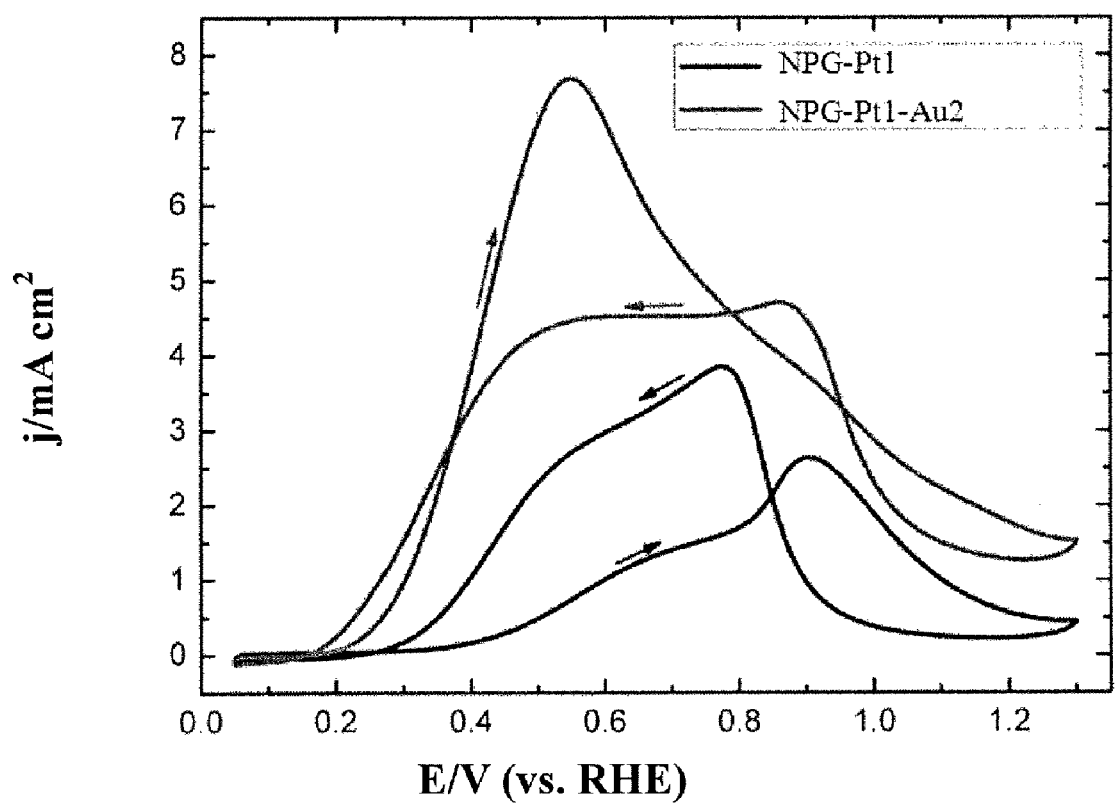
FIG. 2 shows full cyclic voltammery (CV) curves of monolayer platinum decorated NPG (NPG-Pt1) and monolayer platinum decorated NPG with further gold deposition for two times (NPG-Pt1-Au2) according to the present invention in a mixed solution of 0.1M $HClO_4$ and 0.05M HCOOH.
Figure 3:
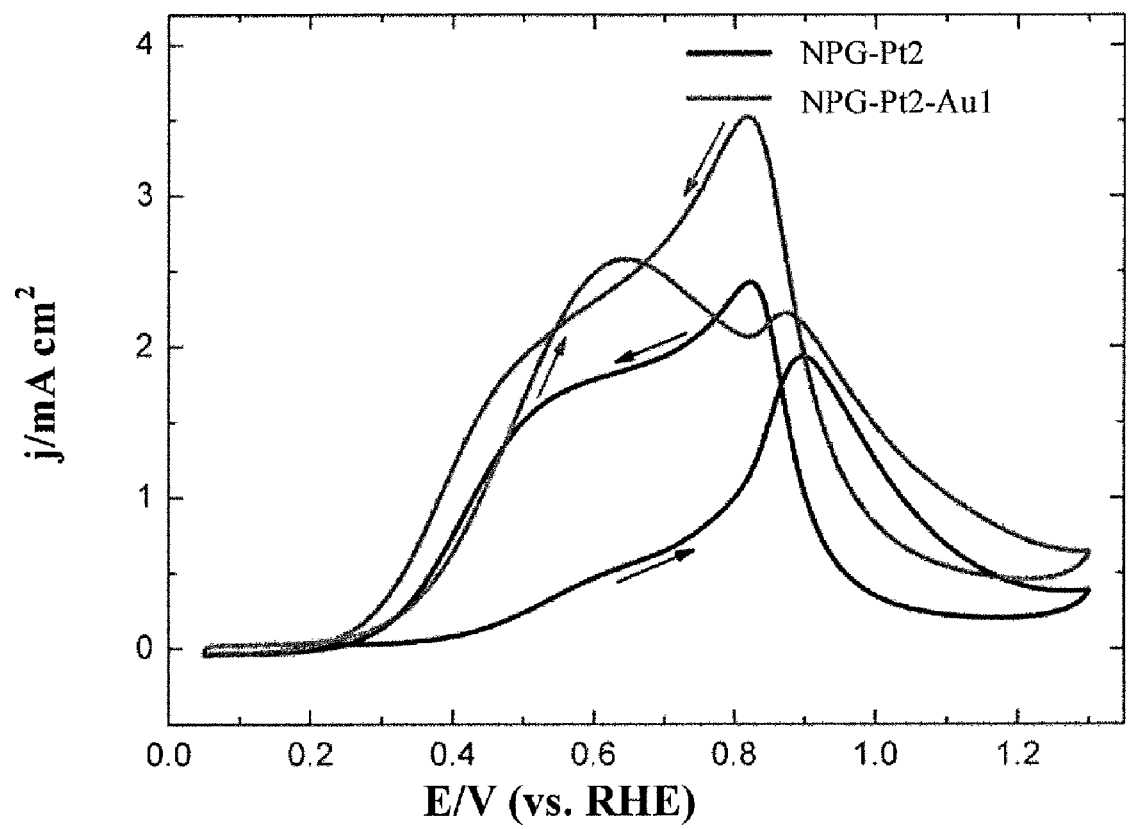
FIG. 3 shows full cyclic voltammery (CV) curves of monolayer platinum decorated NPG for two times (NPG-Pt2) and monolayer platinum decorated NPG for two times with further gold deposition for one time (NPG-Pt2-Au1) according to the present invention in a mixed solution of 0.1M $HClO_4$ and 0.05M HCOOH.

Still another embodiment of the present invention involves a method for preparing a catalyst for a direct formic acid fuel cell. In yet another embodiment of the present invention involves a method for preparing a catalyst for a fuel cell, the catalyst having a low Pt loading amount, a strong tolerance to catalyst poisons, and a long service life, as compared with the traditional carbon supported Pt nanoparticles catalysts. As used herein, a low Pt-loading means that the amount of platinum used is in the range of 1-20 μg/cm$^2$ for a catalyst. This amounts to a dramatic improvement over the prior art which required between 100-500 μg/cm$^2$ of platinum. As used herein, a strong tolerance to catalyst poisons means that the catalyst created according to the method of the present invention effectively avoids the poisoning effect by changing reaction pathways as detailed in FIGS. 2 and 3. As used herein, a long service life means that the catalysts created according to the method of the present invention are more stable and maintain their stability longer than prior catalysts.

When comparing traditional catalyst supported by carbon to the catalysts made by the methods described in the present invention, the advantages of low Pt loading, strong toxic resistance, and long service life demonstrated by catalysts of the present invention are:
1. NPG has superior electron transfer ability and superior chemical and electrochemical corrosion resistance than the traditional load of fuel cell catalyst. Additionally, the three-dimensional structure can make much easier for the reactant to reach the surface of electrode;

2. A noble metal catalyst can be attached on the surface of NPG with a structure ranging from sub-monolayer to a plurality of atomic layers using under potential deposition and replacement. It can increase the utilization rate of noble metal, and Pt-mass normalized catalytic activity ability is more than 100 times higher than that of the commercial Pt/C catalyst.
3. The addition of a gold sub-monolayer can redirect the reaction route of the formic acid oxidation reaction, inhibit the production of toxic intermediate CO, and improve the anti-poisoning ability of the catalyst.
4. The addition of a gold sub-monolayer can improve the stability of the catalyst by inhibiting the oxidation of Pt.

C. EXAMPLES

Example 1

1) A 9K commercial gold-silver alloy sample (2 cm long, 1.8 cm wide, 100 nm thick) was immersed in 68% concentrated $HNO_3$ (wt. %) for 120 min at room temperature (20° C.) to selectively dissolve silver from the alloy. A scanning electron microscope (SEM) image of the NPG is shown in FIG. 1 which illustrates that such nanoporous gold includes a microporous structure exhibiting a pore size of about 20 nm.
2) The NPG was fixed to a glassy carbon electrode, then a monoatomic layer of copper was deposited onto the surface of the NPG through underpotential deposition by controlling potential at 0.25V (vs. RHE) for 5 min in 0.5 mmol/$dm^3$ copper ion solution resulting in an M-NPG.
3) The M-NPG/electrode was immersed into 1 mmol/$dm^3$ platinum ion solution to deposit a monoatomic layer of platinum on the surface of the M-NPG by in situ redox replacement of copper deposited by the under potential deposition with platinum ion resulting in an NPG-Pt. The resulting NPG-Pt/electrode was then cleaned 10 min later.
4) The NPG-PT/electrode was immersed into a 0.5 mmol/$dm^3$ copper ion solution then controlled potential at 0.25V (vs. RHE) for 5 min to underpotential deposit a monoatomic layer of copper resulting in an M-NPG-Pt.
5) The M-NPG-Pt/electrode was then immersed in a 1 mmol/$dm^3$ gold ion solution to deposit a sub-monolayer of gold on the surface of the monoatomic layer of platinum by replacement reaction between gold ion and copper on the surface of the M-NPG-Pt. The resulting NPG-Pt—Au/electrode was then cleaned 10 min later.
6) Steps 4 and 5 may be repeated to deposit additional gold atoms in order to prepare the catalyst. The electrochemically active surface area (EAS) and specific (mA $cm^{-2}$) catalytic activity of this catalyst for formic acid was shown in FIG. 2 as red line.

Example 2

1) A 9K commercial gold-silver alloy sample (2 cm long, 1.8 cm wide, 100 nm thick) was immersed in 68% concentrated $HNO_3$ (wt. %) for 120 min at room temperature (20° C.) to selectively dissolve silver from the alloy. An SEM image of the NPG is shown in FIG. 1 which illustrates that such nanoporous gold includes a microporous structure exhibiting a pore size of about 20 nm.
2) The NPG was fixed to a glassy carbon electrode, then a monoatomic layer of copper was deposited onto the surface of the NPG through underpotential deposition by controlling potential at 0.25V (vs. RHE) for 5 min in 0.5 mmol/$dm^3$ copper ion solution resulting in an M-NPG.
3) The M-NPG/electrode was immersed into 1 mmol/$dm^3$ platinum ion solution to deposit a monoatomic layer of platinum on the surface of the M-NPG by in situ redox replacement of copper deposited by underpotential deposition with platinum ion resulting in an NPG-Pt. The resulting NPG-Pt/electrode was then cleaned 10 min later.
4) Steps 2 and 3 were repeated to deposit additional platinum.
5) The NPG-Pt/electrode was immersed into a 0.5 mmol/$dm^3$ copper ion solution then controlled potential at 0.25V (vs. RHE) for 5 min to underpotential deposit a monoatomic layer copper resulting in an M-NPG-Pt.
6) The M-NPG-Pt/electrode was then immersed in 1 mmol/$dm^3$ gold ion solution to deposit a sub-monolayer of gold on the surface of the platinum layer by replacement reaction between gold ion and copper on the surface of the M-NPG-Pt. The resulting NPG-Pt—Au/electrode was then cleaned 10 min later resulting in a completed catalyst. The electrochemically active surface area (EAS) and specific (mA $cm^{-2}$) catalytic activity of this catalyst for formic acid was shown in FIG. 3 as red line.

Example 3

1) A 9K commercial gold-silver alloy sample (2 cm long, 1.8 cm wide, 100 nm thick) was immersed in 68% concentrated $HNO_3$ (wt. %) for 120 min at room temperature (20° C.) to selectively dissolve silver from the alloy. An SEM image of the NPG is shown in FIG. 1 which illustrates that such nanoporous gold includes a microporous structure exhibiting a pore size of about 20 nm.
2) The NPG was fixed to a glassy carbon electrode, then a monoatomic layer of silver was deposited onto the surface of the NPG through underpotential deposition by controlling potential at 0.65V (vs. RHE) for 5 min in 0.5 mmol/$dm^3$ silver ion solution resulting in an M-NPG.
3) The M-NPG/electrode was immersed into 1 mmol/$dm^3$ platinum ion solution to deposit a monoatomic layer of platinum on the surface of the M-NPG by in situ redox replacement of copper deposited by under potential deposition with platinum ion resulting in an NPG-Pt. The resulting NPG-Pt/electrode was then cleaned 10 min later.
4) The NPG-Pt/electrode was immersed into a 0.5 mmol/$dm^3$ silver ion solution then controlled potential at 0.7V (vs. RHE) for 5 min to underpotential deposit a monoatomic layer silver resulting in an M-NPG-Pt.
5) The M-NPG-Pt/electrode was then immersed in 1 mmol/$dm^3$ gold ion solution to deposit a sub-monolayer of gold on the surface of the platinum layer by replacement reaction between gold ion and copper on the surface of the M-NPG-Pt. The resulting NPG-Pt—Au/electrode was then cleaned 10 min later resulting in a completed catalyst.

Example 4

1) A 9K commercial gold-silver alloy sample (2 cm long, 1.8 cm wide, 100 nm thick) was immersed in 68% concentrated $HNO_3$ (wt. %) for 120 min at room temperature (20° C.) to selectively dissolve silver from the alloy. An SEM image of the NPG is shown in FIG. 1 which illustrates that such nanoporous gold includes a microporous structure exhibiting a pore size of about 20 nm.
2) The NPG was fixed to a glassy carbon electrode, then a monoatomic layer of lead was deposited onto the surface of the NPG through underpotential deposition by controlling potential at −0.1V (vs. RHE) for 5 min in 0.5 mmol/$dm^3$ lead ion solution resulting in an M-NPG.

3) The M-NPG/electrode was immersed into 1 mmol/dm$^3$ platinum ion solution to deposit a monoatomic layer of platinum on the surface of the M-NPG by in situ redox replacement of copper deposited by underpotential deposition with platinum ion resulting in an NPG-Pt. The resulting NPG-Pt/electrode was then cleaned 10 min later.

4) The NPG-Pt/electrode was immersed into a 0.5 mmol/dm$^3$ copper ion solution then controlled potential at 0.25V (vs. RHE) for 5 min to underpotential deposit a monoatomic layer copper resulting in an M-NPG-Pt.

5) The M-NPG-Pt/electrode was then immersed in 1 mmol/dm$^3$ gold ion solution to deposit a sub-monolayer of gold on the surface of the platinum layer by replacement reaction between gold ion and copper on the surface of the M-NPG-Pt. The resulting NPG-Pt—Au/electrode was then cleaned 10 min later resulting in a completed catalyst.

What is claimed is:

1. A method for preparing a catalyst for a direct formic acid fuel cell comprising the steps of:
   a) providing a gold-silver alloy article comprising 10% to 60% gold (wt %) and 40% to 90% silver (wt %) and said article having a length of 0.1 to 1000 cm, a width of 0.1 to 100 cm, and a thickness of 0.01 to 1000 μm;
   b) removing said silver from said gold-silver alloy article by immersing said gold-silver alloy article in a de-alloying solution comprising 0.1 to 70% HNO$_3$ (wt %) for a time period of between 1 s to 100 min at a temperature of 0 to 50° C. forming a nanoporous gold (NPG) article having a plurality of nanopores;
   c) cleaning the surface of said NPG article and removing said de-alloying solution from said nanopores with deionized water;
   d) attaching an electrode to said NPG article;
   e) depositing a monoatomic layer or lower layer of copper, silver, or lead, onto the surface of and within the nanopores of said NPG article through the use of a cyclic voltammery (CV) method or a potentiostatic method by immersing said NPG article in an ion solution comprising 1 μmol/dm$^3$ to 10 mol/dm$^3$ of copper, silver, or lead ion, to form an M-NPG article, where M denotes elemental copper, silver or lead;
   f) removing said M-NPG article from said ion solution;
   g) replacing said monoatomic layer or lower layer of copper, silver, or lead with platinum ions by immersing said M-NPG article into a platinum ion solution comprising 1 μmol/dm$^3$ to 10 mol/dm$^3$ of platinum ion for a time period of between 1 min to 100 h to form an NPG-Pt article;
   h) cleaning said electrode and said NPG-Pt article with deionized water;
   i) wherein steps d-h are repeated to increase the loading of platinum onto said NPG-Pt article to a pre-determined level;
   j) depositing a monoatomic layer or lower layer of copper, silver, or lead, onto the surface of and within the nanopores of said NPG-Pt article through the use of a cyclic voltammery (CV) method or a potentiostatic method by immersing said NPG-Pt article in an ion solution comprising 1 μmol/dm$^3$ to 10 mol/dm$^3$ of copper, silver, or lead ion, to form an M-NPG-Pt article, where M denotes elemental copper, silver or lead;
   k) removing said M-NPG-Pt article from said ion solution;
   l) replacing said monoatomic layer or lower layer of copper, silver, or lead with gold ions by immersing said M-NPG-Pt article into a gold ion solution comprising 1 μmol/dm$^3$ to 10 mol/dm$^3$ of gold ion for a time period of between 1 min to 100 h to form an NPG-Pt—Au article;
   m) cleaning said electrode and said NPG-Pt—Au article with deionized water;
   n) wherein steps j-m are repeated to increase the loading of gold onto said NPG-Pt—Au article/catalyst to a pre-determined level.

2. The method of preparing a catalyst according to claim 1, wherein said alloy being a commercial gold-silver alloy article comprising 37.5% gold (wt %) by weight and 62.5% silver (wt %) and said article having a length of 6 to 20 cm, a width of 1 to 5 cm, and a thickness of 0.1 to 10 μm.

3. The method of preparing a catalyst according to claim 1, wherein said HNO$_3$ concentration of said de-alloying solution described in step b) being 65 to 68 wt %, the time period being 120 min, and the temperature being 20 to 30° C.

4. The method of preparing a catalyst according to claim 1, wherein the concentration of said ion solution described in step e) being about 100 μmol/dm3 to about 100 mmol/dm$^3$ of copper, silver, or lead ion.

5. The method of preparing a catalyst according to claim 1, wherein said deposition of a monoatomic layer or lower layer of copper as described in step e) being completed by immersing the NPG article/electrode into a copper ion solution under constant voltage from 0.25 to 0.45V vs. RHE for 5 min.

6. The method of preparing a catalyst according to claim 1, wherein said deposition of a monoatomic layer or lower layer of silver as described in step e) being completed by immersing the NPG article/electrode into a silver ion solution under constant voltage from 0.65 to 0.85V vs. RHE for 5 min.

7. The method of preparing a catalyst according to claim 1, wherein said deposition of a monoatomic layer or lower layer of lead as described in step e) being completed by immersing the NPG article/electrode into a lead ion solution under constant voltage from −0.1 to 0.1V vs. RHE for 5 min.

8. The method of preparing a catalyst according to claim 1, wherein the concentration of said platinum ion solution described in step g) being about 10 mmol/dm$^3$ and said time period being about 10 min.

9. The method of preparing catalyst according to claim 1, wherein the number of repeats described in step i) being from 0 to 1.

10. The method of preparing catalyst according to claim 1, wherein the concentration of said ion solution described in step j) being about 100 μmol/dm3 to about 100 mmol/dm$^3$ of copper, silver, or lead ion.

11. The method of preparing a catalyst according to claim 1, wherein said deposition of a monoatomic layer or lower layer of copper as described in step j) being completed by immersing the NPG-Pt article/electrode into a copper ion solution under constant voltage from 0.25 to 0.45V vs. RHE for 5 min.

12. The method of preparing a catalyst according to claim 1, wherein said deposition of a monoatomic layer or lower layer of silver as described in step j) being completed by immersing the NPG-Pt article/electrode into a silver ion solution under constant voltage from 0.65 to 0.85V vs. RHE for 5 min.

13. The method of preparing a catalyst according to claim 1, wherein said deposition of a monoatomic layer or lower layer of lead as described in step j) being completed by immersing the NPG-Pt article/electrode into a lead ion solution under constant voltage from −0.1 to 0.1V vs. RHE for 5 min.

14. The method of preparing catalyst according to claim 1, wherein the concentration of said gold ion solution described in step l) being about 1 mmol/dm$^3$ and said time period being about 10 min.

15. The method of preparing catalyst according to claim 1, wherein the number of repeats described in step n) being from 0 to 1.

16. The method according to claim 1, wherein said catalyst having a thickness of from about 0.1 μm to about 10 μm, a width of from about 1 cm to about 5 cm, and a length of from about 6 cm to about 20 cm.

17. The method according to claim 1, wherein said catalyst being a metal alloy having a three-dimensional nanoporous structure and having nanopore sizes in the range of 2 nm to 100 nm.

18. The method according to claim 1, wherein said catalyst being a metal alloy having a plurality of atomic or subatomic layers of platinum or/and gold on the surface, said gold layer being above the platinum layer.

19. A method for preparing a catalyst comprising the steps of:
   a) providing a gold-silver alloy article;
   b) removing said silver from said gold-silver alloy article by immersing said gold-silver alloy article in a de-alloying solution for a certain time period at a certain temperature forming a nanoporous gold (NPG) article having a plurality of nanopores;
   c) cleaning the surface of said NPG article and removing said de-alloying solution from said nanopores;
   d) attaching an electrode to said NPG article;
   e) depositing a monoatomic layer or lower layer of copper, silver, or lead, onto the surface of and within the nanopores of said NPG article through the use of a cyclic voltammery (CV) method or a potentiostatic method by immersing said NPG article in an ion solution comprising a copper, a silver, or a lead ion, to form an M-NPG article, where M denotes elemental copper, silver or lead;
   f) removing said M-NPG article from said ion solution;
   g) replacing said monoatomic layer or lower layer of copper, silver, or lead with platinum ions by immersing said M-NPG article into a platinum ion solution for a time period to form an NPG-Pt article;
   h) cleaning said electrode and said NPG-Pt article;
   i) wherein steps d-h are repeated to increase the loading of platinum onto said NPG-Pt article to a pre-determined level;
   j) depositing a monoatomic layer or lower layer of copper, silver, or lead, onto the surface of and within the nanopores of said NPG-Pt article through the use of a cyclic voltammery (CV) method or a potentiostatic method by immersing said NPG-Pt article in an ion solution comprising 1 $\mu mol/dm^3$ to 10 $mol/dm^3$ of copper, silver, or lead ion, to form an M-NPG-Pt article, where M denotes elemental copper, silver or lead;
   k) removing said M-NPG-Pt article from said ion solution;
   l) replacing said monoatomic layer or lower layer of copper, silver, or lead with gold ions by immersing said M-NPG-Pt article into a gold ion solution comprising 1 $\mu mol/dm^3$ to 10 $mol/dm^3$ of gold ion for a time period of between 1 min to 100 h to form an NPG-Pt—Au article;
   m) cleaning said electrode and said NPG-Pt—Au article with deionized water; and
   n) wherein steps j-m are repeated to increase the loading of gold onto said NPG-Pt—Au article/catalyst to a pre-determined level.

20. The product of the method according to claim 19.

* * * * *